United States Patent
Glazewski et al.

(10) Patent No.: US 11,413,559 B2
(45) Date of Patent: Aug. 16, 2022

(54) J-HOOK FILTER ASSEMBLY

(71) Applicant: MANN+HUMMEL Filtration Technology US LLC, Gastonia, NC (US)

(72) Inventors: James Michael Glazewski, Gastonia, NC (US); Matthew Robert Hudson, Belmont, NC (US); David Brent Harrelson, Mt. Holly, NC (US)

(73) Assignee: MANN+HUMMEL Filtration Technology US LLC, Gastonia, NC (US)

( * ) Notice: Subject to any disclaimer, the term of this patent is extended or adjusted under 35 U.S.C. 154(b) by 231 days.

(21) Appl. No.: 16/685,770

(22) Filed: Nov. 15, 2019

(65) Prior Publication Data
US 2020/0078708 A1    Mar. 12, 2020

Related U.S. Application Data

(62) Division of application No. 15/402,930, filed on Jan. 10, 2017, now Pat. No. 10,493,385.

(51) Int. Cl.
*B01D 27/08* (2006.01)
*B01D 27/06* (2006.01)
*B01D 27/00* (2006.01)

(52) U.S. Cl.
CPC .......... *B01D 27/08* (2013.01); *B01D 27/005* (2013.01); *B01D 27/06* (2013.01); *B01D 2201/291* (2013.01); *B01D 2201/295* (2013.01)

(58) Field of Classification Search
None
See application file for complete search history.

(56) References Cited

U.S. PATENT DOCUMENTS

| | | |
|---|---|---|
| 3,232,437 A | 2/1966 | Hultgren |
| 3,397,786 A | 8/1968 | Hultgren |
| 3,859,216 A | 1/1975 | Sisson et al. |
| 4,369,113 A | 1/1983 | Stifelman |
| 4,743,374 A | 5/1988 | Stifelman |
| 5,104,537 A | 4/1992 | Stifelman et al. |
| 5,342,519 A | 8/1994 | Friedmann et al. |
| 5,395,518 A | 3/1995 | Gulsvig |
| 5,490,930 A | 2/1996 | Krull |

(Continued)

FOREIGN PATENT DOCUMENTS

JP    2015205256 A    11/2015

OTHER PUBLICATIONS

International Search Report and Written Opinion for PCT Application No. PCT/US2018/013057 dated Apr. 25, 2018.

(Continued)

*Primary Examiner* — David C Mellon
(74) *Attorney, Agent, or Firm* — Honigman LLP (57) ABSTRACT

A fluid filter assembly includes a housing, a proximal end cap, and a nut plate. The housing defines a longitudinal axis and includes an inner surface. The inner surface surrounds the longitudinal axis and defines a hook portion. The proximal end cap is disposed within the housing and includes a flange engaging the inner surface of the housing. The nut plate is disposed within the housing and includes a proximal end and a distal end. The proximal end engages the hook portion of the housing. The distal end engages the proximal end cap.

8 Claims, 4 Drawing Sheets

(56) References Cited

U.S. PATENT DOCUMENTS

| | | |
|---|---|---|
| 5,785,850 A | 7/1998 | Lynch et al. |
| 5,885,447 A | 3/1999 | Theisen et al. |
| 5,904,357 A | 5/1999 | Demirdogen et al. |
| 5,906,736 A | 5/1999 | Bounnakhom et al. |
| 5,996,810 A | 12/1999 | Bounnakhom et al. |
| 6,045,693 A | 4/2000 | Miller et al. |
| 6,202,859 B1 * | 3/2001 | Langsdorf ............ B01D 27/005 210/DIG. 17 |
| 6,345,721 B1 | 2/2002 | Durre et al. |
| 6,468,425 B2 | 10/2002 | Reinhart |
| 6,537,453 B2 | 3/2003 | Beard et al. |
| 6,554,140 B2 | 4/2003 | Steger, Jr. et al. |
| 6,823,996 B2 | 11/2004 | Durre |
| 6,843,377 B1 | 1/2005 | Roll |
| 6,893,560 B2 | 5/2005 | Reinhart |
| 6,919,023 B2 | 7/2005 | Merritt et al. |
| 6,922,894 B2 | 8/2005 | Durre |
| 6,969,461 B2 | 11/2005 | Beard et al. |
| 6,998,045 B2 | 2/2006 | Durre |
| 7,303,673 B1 | 12/2007 | Glazewski |
| 7,410,572 B2 | 8/2008 | Beard et al. |
| 7,510,653 B2 | 3/2009 | Martin et al. |
| 7,556,155 B2 | 7/2009 | Harder et al. |
| 8,293,103 B2 | 10/2012 | Johnson et al. |
| 9,061,222 B2 | 6/2015 | Fisher |
| 9,061,622 B2 | 6/2015 | Knox |
| 2002/0074281 A1 | 6/2002 | Steger et al. |
| 2002/0139735 A1 | 10/2002 | Stenersen et al. |
| 2005/0252838 A1 | 11/2005 | Fisher |
| 2007/0138078 A1 | 6/2007 | Durre |
| 2008/0217237 A1 | 9/2008 | Deedrich et al. |
| 2009/0114580 A1 | 5/2009 | Hussain |
| 2010/0044293 A1 | 2/2010 | Fisher et al. |
| 2010/0200492 A1 | 8/2010 | Hussain |
| 2012/0074049 A1 | 3/2012 | Petersen et al. |
| 2012/0223001 A1 | 9/2012 | Beard |
| 2013/0043176 A1 | 2/2013 | Johnson et al. |
| 2013/0199983 A1 | 8/2013 | Patel et al. |
| 2013/0327696 A1 | 12/2013 | Bagci et al. |
| 2014/0061110 A1 | 3/2014 | Hawkins et al. |
| 2015/0090651 A1 | 4/2015 | Kotale et al. |
| 2016/0144298 A1 | 5/2016 | Jokschas et al. |

OTHER PUBLICATIONS

Non-Final Office Action dated Apr. 26, 2019, issued by the U.S. Patent and Trademark Office relating to U.S. Appl. No. 15/402,930.

* cited by examiner

J-HOOK FILTER ASSEMBLY

CROSS REFERENCE TO RELATED APPLICATIONS

This U.S. patent application is a division of, and claims priority under 35 U.S.C. § 121 from, U.S. patent application Ser. No. 15/402,930, filed on Jan. 10, 2017, the disclosure of which is considered part of the disclosure of this application and is hereby incorporated by reference in its entirety.

TECHNICAL FIELD

This disclosure relates to filter assemblies, and more particularly to a spin-on filter assembly having a nut plate and a housing secured together using a j-hook connection.

BACKGROUND

Spin-on filters may be used in fluid delivery systems and lubrication systems to remove particulates within a fuel stream or a lubrication stream between a fuel tank or a lubrication reservoir and an engine and/or other components. Spin-on filters typically mount to a mounting adapter of a fluid circuit and receive and return fluid therefrom. In some configurations, spin-on filters include a steel canister housing, a filter element, and having a closed end and an open end. At the open end, a connection must be provided to connect the spin-on filter to the mounting adapter in a spin-on fashion.

Joining a flange with a fluid filter typically involves placing springs against an endcap to hold the flange in place. The placement of springs increases the cost and complexity of the spin-on filter.

SUMMARY

According to one aspect, the present disclosure provides a fluid filter assembly. The fluid filter assembly may include a housing, a proximal end cap, and a nut plate. The housing may define a longitudinal axis and may include an inner surface. The inner surface may surround the longitudinal axis and define a hook portion. The proximal end cap may be disposed within the housing and may include a flange engaging the inner surface of the housing. The nut plate may be disposed within the housing and may include a proximal end and a distal end. The proximal end may engage the hook portion of the housing. The distal end may engage the proximal end cap.

In some implementations, the inner surface of the housing includes a proximal portion defining a first diameter, a distal portion defining a second diameter, and an intermediate portion defining a third diameter. The third diameter may be less than the first diameter and greater than the second diameter. The flange may engage the intermediate portion of the inner surface.

In some implementations, the proximal end cap includes a plurality of centering features engaging the distal portion of the inner surface to center the proximal end cap within the housing.

The nut plate may include a ring portion disposed within the hook portion of the housing.

In some implementations, the inner surface of the housing includes a proximal portion defining a first diameter, a distal portion defining a second diameter, and an intermediate portion defining a third diameter. The third diameter may be less than the first diameter and greater than the second diameter. The ring portion may include an outer surface defining a fourth diameter substantially equal to the first diameter.

In some implementations, the flange engages the intermediate portion of the inner surface.

In some implementations, the nut plate includes an inner ring portion and an outer ring portion. The inner ring portion and the outer ring portion may extend about the longitudinal axis and define an annular groove therebetween. The inner ring portion and the outer ring portion may extend toward the proximal end cap along the longitudinal axis.

In some implementations, the fluid filter assembly includes a filter media and a distal end cap. The filter media may include a proximal end and a distal end. The distal end cap may engage the distal end of the filter media. The proximal end cap may engage the proximal end of the filter media. The distal end cap may include a distal centering feature engaging the inner surface of the housing to center the distal end cap within the housing. The proximal end cap may include a proximal centering feature engaging the inner surface to center the proximal end cap within the housing.

According to another aspect, the present disclosure provides a method of manufacturing a fluid filter assembly. The method may include providing a housing having an inner surface surrounding a longitudinal axis. The method may also include inserting a filter element within the housing. The method may further include engaging a proximal end cap with a proximal end of the filter element. The method may further include engaging a nut plate with the proximal end cap. The nut plate may include an axially-extending ring. The method may also include engaging a hook portion of the housing with the axially-extending ring to secure the filter, the proximal end cap, and the nut plate within the housing.

In some implementations, engaging a hook portion of the housing with the axially extending ring includes crimping the housing to the axially-extending ring.

In some implementations, the proximal end cap includes a radially outwardly extending flange. Engaging the proximal end cap with an end of the filter element may include engaging the flange with the inner surface of the housing.

In some implementations, the inner surface of the housing includes a radially inwardly extending intermediate portion. The flange may engage the intermediate portion.

In some implementations, the flange includes a plurality of fluid openings circumferentially spaced about the longitudinal axis. The fluid openings may direct fluid toward the filter element.

In some implementations, the inner surface of the housing includes a radially inwardly extending intermediate portion. At least one of the proximal end cap and the nut plate may engage the intermediate portion.

In some implementations, the hook portion defines a j-shaped construct.

In some implementations, the hook portion extends radially inwardly.

In some implementations, the method includes engaging a distal end cap with a distal end of the filter element. The distal end may be disposed opposite the proximal end. The method may also include engaging the distal end cap with the inner surface of the housing.

According to another aspect, the present disclosure provides a fluid filter assembly. The fluid filter assembly may include a filter defining a longitudinal axis, an end cap that abuts an end of the filter, a nut plate with a plurality of threads that extend radially inward toward the longitudinal axis, and a housing including a j-shaped hook. The end cap may include a ring and a flange. An inner surface of the ring may contact the end of the filter. The flange may extend from an outer surface of the ring. The nut plate may include a lip with a plurality of locking grooves. The lip may be configured to hold the end cap in the locking grooves. The j-shaped hook may lock with the nut plate to prevent movement of the nut plate.

Implementations of the disclosure may include one or more of the following optional features. In some implementations, the ring of the end cap includes an annular groove defined by an inner rim and an outer rim. The inner rim and the outer rim may extend toward the filter along the longitudinal axis. The annular groove may be configured to hold a filter. The filter may be cylindrically shaped. The outer surface may extend radially outward from the longitudinal axis.

In some examples, the filter is disposed in the annular groove between the outer rim and the inner rim. The end cap may include a plurality of fluid openings circumferentially spaced about the longitudinal axis. The fluid openings may direct fluid toward the filter.

The inner ring of the end cap may form an opening. The opening may be configured to direct fluid away from the filter. The end cap may include a support beam that extends along the longitudinal axis. The support beam may connect the flange to the ring. In some examples, the end cap is angled radially inward.

Another aspect of the disclosure provides a method of manufacturing a fluid filter assembly. The method may include inserting a ringed filtration media about an outer surface of a filter, placing an end cap about an end of the filter, engaging a nut plate with the end cap, and affixing a housing including a j-shaped hook to the nut plate. The filter may define a longitudinal axis. The end cap may include a ring and a flange. An inner surface of the ring may contact the end of the filter. The flange may extend from an outer surface of the ring. The nut plate may include a plurality of threads that extend radially inward toward the longitudinal axis. The nut plate may include a lip with a plurality of locking grooves. The lip may be configured to hold the end cap in the locking grooves. The j-shaped hook may extend radially inward toward the longitudinal axis. The j-shaped hook may lock with the nut plate to prevent movement of the nut plate.

This aspect may include one or more of the following optional features. In some implementations, the ring of the end cap includes an inner rim and an outer rim. The inner rim and the outer rim may extend toward the filter along the longitudinal axis.

In some examples, an outer surface of the filter is configured to hold a filter, the filter being cylindrically shaped. The outer surface may extend radially outward from the longitudinal axis. The filter may be disposed between the outer rim and the inner rim.

In some implementations, the flange includes a plurality of fluid openings circumferentially spaced about the longitudinal axis. The fluid openings may direct fluid toward the filter. The inner ring of the end cap may form an opening, the opening configured to direct fluid away from the filter. In some examples, the end cap includes a support beam that extends along the longitudinal axis, the support beam connects the flange to the ring. The end cap may be angled radially inward.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
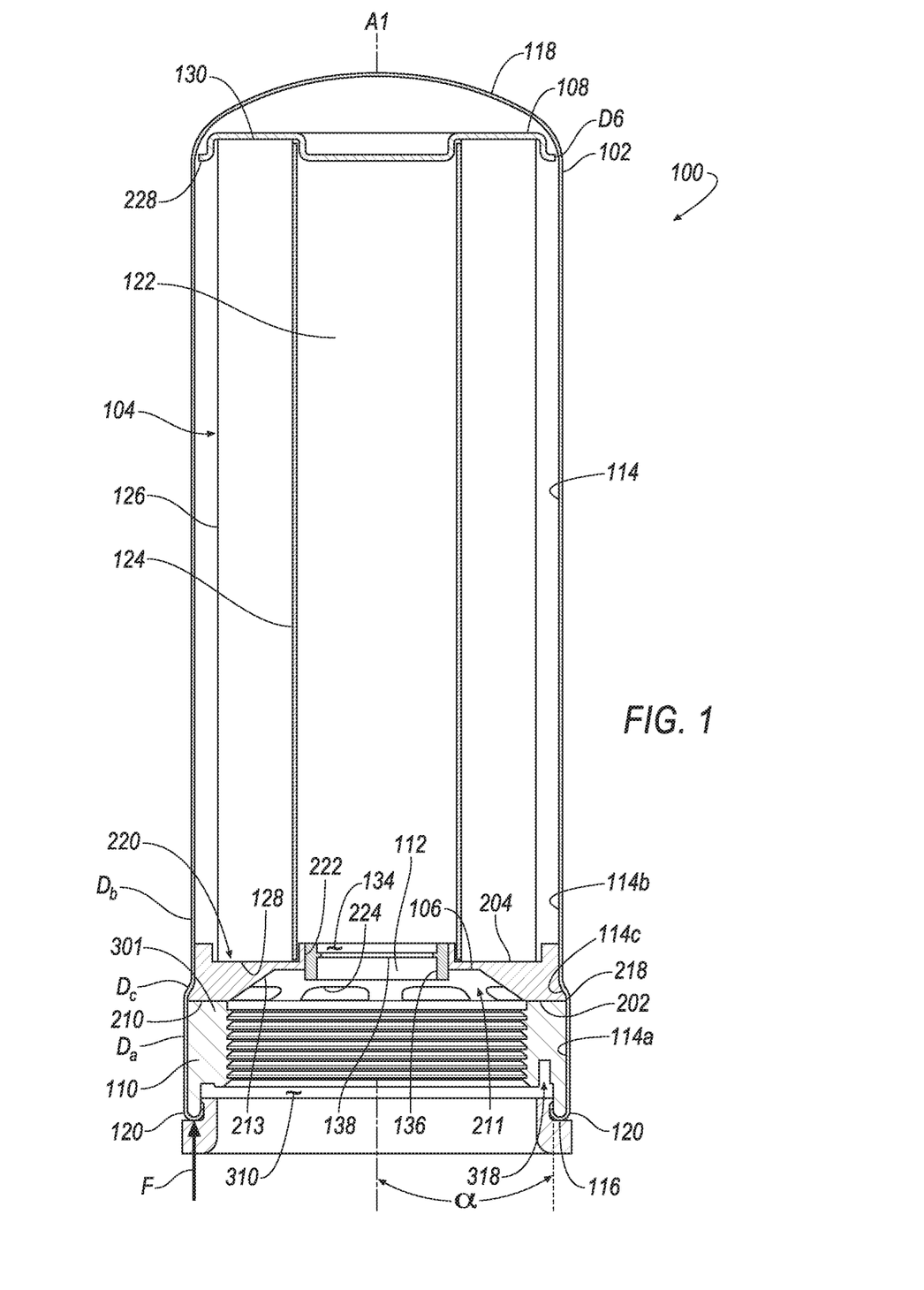
FIG. 1 is a cross-sectional view of a fluid filter assembly having a j-hook seam in accordance with the principles of the present disclosure.

Referring to FIG. 1, a fluid filter assembly 100 is shown. In some implementations, the filter assembly 100 may be utilized to filter a flow of fuel therethrough. It will be appreciated, however, that the filter assembly 100 may be operable to filter other fluids within the scope of the present disclosure.

The filter assembly 100 may include a housing 102, a filter 104, a proximal end cap 106, a distal end cap 108, a nut plate 110, and a sealing member 112. The housing 102 may define a generally cylindrical construct defining a longitudinal axis A1. The housing 102 may include an inner surface 114 surrounding, and extending along, the longitudinal axis A1 from a proximal end 116 of the housing 102 to a distal end 118 of the housing 102. The inner surface 114 may include a proximal portion 114a extending from the proximal end 116, a distal portion 114b extending from the distal end 118, and an intermediate portion 114c extending from the proximal portion 114a to the distal portion 114b. The proximal portion 114a and the distal portion 114b may each define a generally circular cylindrical shape extending along (e.g., parallel to) the longitudinal axis A1. In some implementations, the proximal end 116 may be open and the distal end 118 may be closed. In this regard, at least a portion of the distal portion 114b of the inner surface 114 may extend radially inwardly.

The intermediate portion 114c of the housing 102 may extend in a direction transverse to, and about, the longitudinal axis A1. For example, in some implementations, the intermediate portion 114c may extend radially outward from the distal portion 114b, and radially inward from the proximal portion 114a. In some implementations, the intermediate portion 114c may define a frustoconical shape extending along the longitudinal axis A1. In this regard, the intermediate portion 114c may define an increasing diameter Dc extending from the proximal portion 114a to the distal portion 114b, such that the proximal portion 114a defines a diameter Da that is greater than a diameter Db defined by the distal portion 114b.

The proximal end 116 of the housing 102 may further include a hook portion 120. In some implementations, the hook portion 120 may be defined by the inner surface 114 of the housing 102. For example, the hook portion 120 may be defined by the proximal portion 114a of the inner surface 114. In this regard, the proximal portion 114a may extends radially inward proximate the proximal end 116 to define a generally j-shaped hook portion 120 extending about the longitudinal axis A1. As will be explained in more detail below, in an assembled configuration, the hook portion 120 engages the nut plate 110 to prevent movement of the nut plate 110 and/or the proximal end cap 106 relative to the housing 102.

The filter 104 may include a central tube 124 and a filter media 126 surrounding the central tube 124. The filter media 126 may include a proximal end 128 and a distal end 130. In some implementations, the filter media 126 defines a generally cylindrical construct extending from the proximal end 128 to the distal end 130. In the assembled configuration, the filter 104 may be disposed within the housing 102 such that the inner surface 114 surrounds the filter 104, and the distal end 130 of the filter media 126 is disposed proximate the distal end 118 of the housing 102. The central tube 124 defines a passage 122 extending along the axis A1. In some implementations, the central tube 124 includes a plurality of perforations (not shown) defining radially extending flow passages through the central tube 124. The central tube 124 may be formed from metal, plastic, or any other suitable material.

Figure 2:
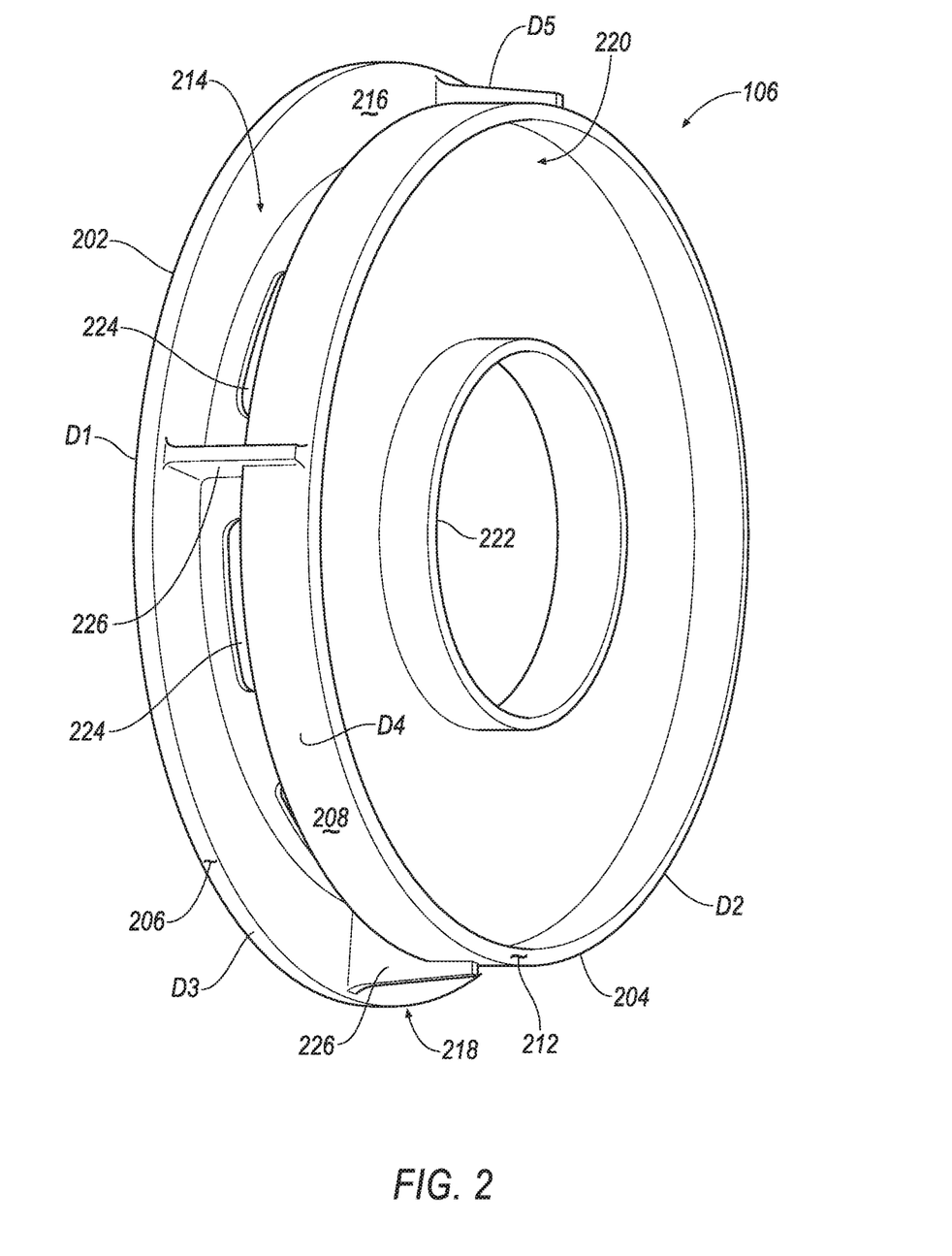
FIG. 2 is a perspective view of an endcap of the fluid filter assembly of FIG. 1.

With reference to FIGS. 1 and 2, the proximal end cap 106 may include a proximal end 202, a distal end 204, a proximal outer surface 206, and a distal outer surface 208. The proximal end 202 may be defined at least in part by a proximal end surface 210 (FIG. 1) extending in a direction transverse to the longitudinal axis A1. For example, the surface 210 may extend in a radial direction and define an outer diameter D1. The proximal end surface 210 may include a recess 211 defined at least in part by a wall 213. The recess 211 may be concentrically disposed about the axis A1 and surrounded by the surface 210. The wall 213 may extend in a direction transverse or parallel to the axis A1. In this regard, while the wall 213 is illustrated in FIG. 1 as extending in a direction generally transverse to the axis A1, it will be appreciated that the wall 213 may extend in a direction parallel to, and concentrically about, the axis A1, within the scope of the present disclosure.

The distal end 204 of the proximal end cap 106 may be defined at least in part by a distal end surface 212 extending in a direction transverse to the longitudinal axis A1. For example, the surface 212 may extend in a radial direction and define an outer diameter D2 that is less than the outer diameter D1. The proximal outer surface 206 may extend axially from the proximal end surface 210. In some implementations, the proximal outer surface 206 defines an outer diameter D3. The outer diameter D3 may be substantially equal to the outer diameter D1 defined by the proximal end surface 210. The distal outer surface 208 may extend axially from the distal end surface 212. In some implementations, the distal outer surface 208 defines an outer diameter D4. The outer diameter D4 may be substantially equal to the outer diameter D2 defined by the distal end surface 212. At least one of the proximal and distal outer surfaces 206 and 208 may include, and/or otherwise define in part, an annular channel 214. In this regard, the annular channel 214 may be defined in part by a stop surface 216 extending from proximal outer surface 206. The stop surface 216 may extend in a direction transverse to the axis A1. In some implementations, the stop surface 216 extends radially inwardly from the proximal outer surface 206, such that the proximal end surface 210, the proximal outer surface 206, and the stop surface 216 define a flange 218. In this regard, the flange 218 may extend annularly about the proximal end cap 106.

The proximal end cap 106 may further define a central aperture 222, a plurality of fluid openings 224, and a plurality of proximal centering features 226. The central aperture 222 may extend through the proximal and distal ends 202, 204 of the proximal end cap 106. In this regard, the central aperture 222 may be concentrically disposed within the recess 211. The fluid openings 224 may be spaced about the circumference of the proximal end cap 106 and may be in fluid communication with the channel 214 and the aperture 222 and/or the recess 211. The centering features 226 may be spaced about the circumference of the proximal end cap 106. In some implementations, the centering features 226 may include support beams 226 extending axially from the flange 218 and radially from the distal outer surface 208 such that the support beams 226 traverse the annular channel 214. The support beams 226 may collectively define an outer diameter D5. The outer diameter D5 may be substantially equal to the diameter Db defined by the distal portion 114b of the housing 102. Accordingly, in the assembled configuration, the support beams 226 may engage the distal portion 114b of the housing 102 to center the filter 104 and the proximal end cap 106 within the housing 102.

With reference to FIG. 1, the distal end cap 108 may include one or more radially outwardly extending distal centering features 228. In this regard, the distal centering features 228 may extend outwardly from the distal end cap 108 to define an outermost diameter D6 of the distal end cap 108. In some implementations, the distal centering feature 228 includes a radially extending flange extending annularly about the distal end cap 108 and defining the diameter D6. In other implementations, the distal centering feature 228 includes a plurality of flanges circumferentially spaced about the distal end cap 108 and defining the diameter D6.

Figure 3:
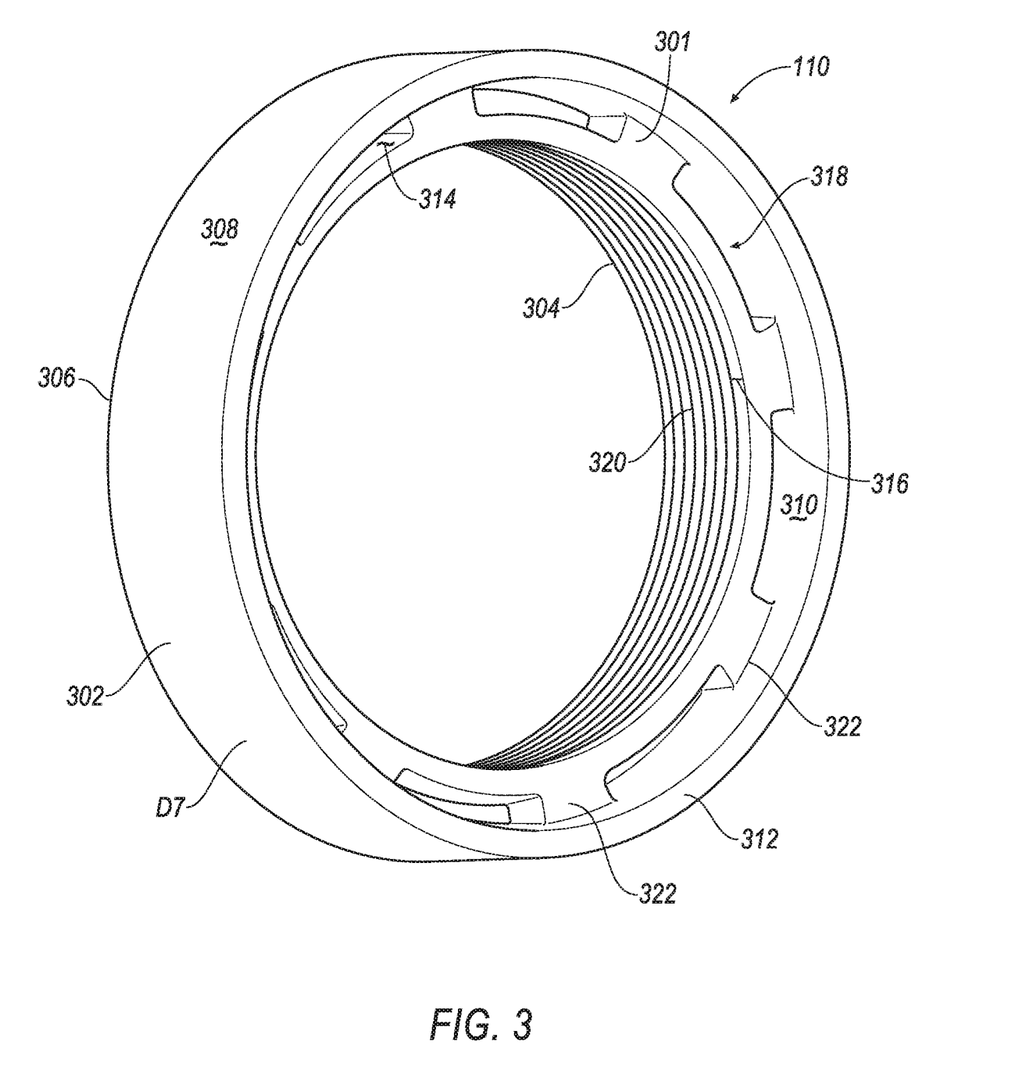
FIG. 3 is a perspective view of a nut plate of the fluid filter assembly of FIG. 1.

With reference to FIGS. 1 and 3, the nut plate 110 may include a base 301, an outer ring 302, and an inner ring 304. The base 301 may define a distal end 306 of the nut plate 110. The outer ring 302 may extend from the base 301 and may include an outer surface 308 and an inner surface 310. The inner and outer surface 308, 310 may extend annularly about the longitudinal axis A1. The outer surface 308 may extend from the distal end 306 to a proximal end 312. The outer surface 308 may define an outer diameter D7. In some implementations, the outer diameter D7 may be substantially equal to the diameter Da of the inner surface 114a. The inner surface 310 may define an angle α relative to the longitudinal axis A1. In some implementations, the angle α is substantially equal to zero degrees, such that the inner surface 310 is substantially parallel to the longitudinal axis A1. In other implementations, the angle α is between zero degrees and twenty-five degrees. For example, the angle α may be substantially equal to fifteen degrees.

The inner ring 304 may extend from the base 301 and may include an outer surface 314 and an inner surface 316. The outer surface 314 of the inner ring 304 and the inner surface 310 of the outer ring 302 may define an annular groove or channel 318 therebetween. In this regard, the channel 318 may be defined by the outer surface 314, the inner surface 310, and the base 301. The inner surface 316 of the inner ring 304 may include a plurality of threads 320.

The nut plate 110 may further include a plurality of ribs 322 extending radially outwardly from and between the outer surface 314 of the inner ring 304 and the inner surface 310 of the outer ring 302. In this regard, the ribs 322 may be uniformly spaced within the channel 318 and about the longitudinal axis A1. The ribs 322 and the channel 318 may allow fluid to flow toward the flange of the endcap, as described in more detail below. While the ribs 322 are generally shown opposite the distal end 306 of the nut plate 110, it will be appreciated that the ribs 322 may be disposed adjacent the distal end 306 of the nut plate 110 within the scope of the present disclosure.

The outer ring 302 may optionally have a plurality of grooves (not shown) to allow the endcap to rotatably lock in place. The nut plate 110 may have a lip (not shown) with a plurality of locking grooves (not shown). The lip may hold the proximal end cap 106 in the locking grooves.

The sealing member 112 may be formed from a polymer or other material suitable for sealingly engaging the inner surface 310 of the nut plate 110. In this regard, in some implementations, the sealing member 112 defines an annular construct having an inner surface 134 defining a through hole 136. The inner surface 134 may include annular rib 138 extending radially inwardly from the inner surface 134. While the sealing member 112 is generally shown and described herein as being a grommet, it will be appreciated that the sealing member 112 may include other constructs, such as an O-ring, for example, within the scope of the present disclosure.

A method of assembling the filter assembly 110 may include placing the filter 104 within the housing 102 such that a portion of the filter media 126 or the distal end cap 108 engages the inner surface 114 of the housing 102. The proximal end cap 106 and the nut plate 110 may be placed within the housing 102 such that one of the proximal end cap 106 and the nut plate 110 engages the filter media 126, and one of the proximal end cap 106 and the nut plate 110 engages the inner surface 114 of the housing 102. For example, the distal end 204 of the proximal end cap 106 may engage the filter media 126, and the stop surface 216 of the proximal end cap 106 may engage the intermediate portion 114c of the inner surface 114. The housing 102 may be secured to one of the proximal end cap 106 and the nut plate 110. In some implementations, the proximal end 116 of the housing 102 may be crimped to engage the outer ring 302 of the nut plate 110. For example, the proximal end 116 of the housing 102 may be crimped radially inwardly to form the hook portion 120. The hook portion 120 may engage the proximal end 312 and the inner surface 310 of the nut plate 110 to secure the filter 104, the distal end cap 108, the proximal end cap 106, and the nut plate 110 within the housing 102. In this regard, the hook portion 120 may further secure the nut plate 110 and the proximal end cap 106 between (relative to the longitudinal axis A1) the proximal end 116 of the housing 102 and the intermediate portion 114c of the housing 102. The angle α may improve the engagement between the hook portion 120 and the nut plate 110 to further secure the nut plate 110 within the housing 102, and prevent relative movement between the nut plate 110 and the housing 102. For example, a fifteen degree value for the angle α may improve the engagement between the hook portion 120 and the nut plate 110 to further secure the nut plate 110 within the housing 102.

In the assembled configuration, the proximal end 128 of the filter media 126 and/or the central tube 124 may engage the distal end 204 of the proximal end cap 106, and the distal end 130 of the filter media 126 and/or the central tube 124 may engage the distal end cap 108. In this regard, the distal end 204 of the proximal end cap 106 may include, and/or otherwise define, an annular groove 220. The filter media 126 and/or the central tube 124 may be at least partially disposed within the annular groove 220. The centering features 228 of the distal end cap 108 may engage the inner surface 114 of the housing 102 to center the distal end cap 108 and the filter media 126 within the housing 102 relative to the longitudinal axis A1. The centering features 226 of the proximal end cap 106 may engage the inner surface 114 of the housing 102 to center the proximal end cap 106 and the filter media 126 within the housing 102 relative to the longitudinal axis A1.

Figure 4:
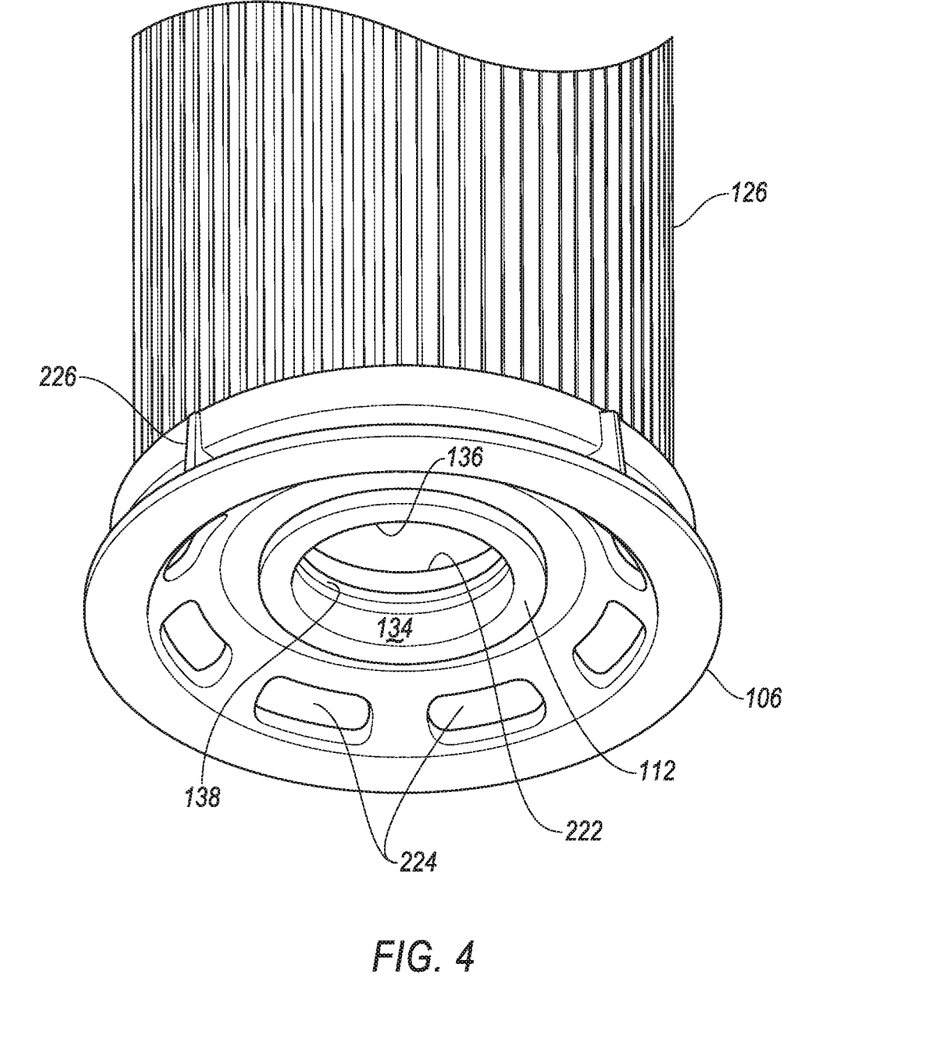
FIG. 4 is a partial perspective view of filtration media and an endcap of the fluid filter assembly of FIG. 1.

The nut plate 110 may releasably seal the proximal end cap 106 and the distal end cap 108 to the filter media 126. For example, the proximal end cap 106 may be pressed to the filter 104 by the nut plate 110. FIG. 4 illustrates the end cap 106 mated with the filter media 126. In operation, fluid flows through the plurality of fluid openings 224, where the filtration media filters the fluid. Filtered fluid flows through an aperture 222 formed in the proximal end cap 106.

The nut plate 110 may further releasably seal the proximal end cap 106 to the housing 102. In this regard, the flange 218 of the proximal end cap 106 may engage the intermediate portion 114c of the inner surface 114 of the housing 102, while the centering features 226 may engage the distal portion 114b of the inner surface 114 of the housing 102. The hook portion 120 of the housing 102 may engage the outer ring 302 of the nut plate 110 and apply a force F thereon. An axially-extending component of the force F may be transmitted by the nut plate 110 to the proximal end cap 106, and by the proximal end cap 106 to the intermediate portion 114c of the surface 114 of the housing 102, to releasably seal the proximal end cap 106 to the housing 102.

A number of implementations have been described. Nevertheless, it will be understood that various modifications may be made without departing from the spirit and scope of the disclosure. Accordingly, other implementations are within the scope of the following claims.

What is claimed is:

1. A method of manufacturing a fluid filter assembly, the method comprising:
providing a housing including an inner surface surrounding a longitudinal axis, the inner surface including a proximal portion defining a first diameter, a distal portion defining a second diameter, and an intermediate portion defining a third diameter that is less than the first diameter and greater than the second diameter;
engaging a proximal end cap with the intermediate portion of the inner surface of the housing;
engaging a nut plate with the proximal end cap; and
forming a hook portion of the housing to engage the nut plate and wedge the nut plate between the hook portion and the proximal end cap.

2. The method of claim 1, wherein forming the hook portion of the housing includes crimping the housing to an axially-extending ring of the nut plate.

3. The method of claim 1, further comprising:
inserting a filter element within the housing; and
engaging the proximal end cap with the filter element, wherein engaging the proximal end cap with the filter element includes engaging a radially outwardly extending flange of the proximal end cap with the inner surface of the housing.

4. The method of claim 3, wherein the flange includes a plurality of fluid openings circumferentially spaced about the longitudinal axis.

5. The method of claim 4, wherein the fluid openings direct fluid toward the filter element.

6. The method of claim 3, further comprising:
engaging a distal end cap with a distal end of the filter element, opposite the proximal end cap; and
engaging the distal end cap with the inner surface of the housing.

7. The method of claim 1, wherein the hook portion defines a j-shaped construct.

8. The method of claim 1, wherein the hook portion extends radially inwardly.

\* \* \* \* \*